United States Patent [19]
Gore

[11] 4,187,390
[45] * Feb. 5, 1980

[54] POROUS PRODUCTS AND PROCESS THEREFOR

[75] Inventor: Robert W. Gore, Newark, Del.

[73] Assignee: W. L. Gore & Associates, Inc., Newark, Del.

[ * ] Notice: The portion of the term of this patent subsequent to Apr. 27, 1993, has been disclaimed.

[21] Appl. No.: 808,545

[22] Filed: Jun. 21, 1977

Related U.S. Application Data

[60] Continuation of Ser. No. 637,298, Dec. 3, 1975, abandoned, which is a division of Ser. No. 376,188, Jul. 3, 1973, Pat. No. 3,953,566, which is a continuation of Ser. No. 39,753, May 21, 1970, abandoned.

[51] Int. Cl.² .......................... H01B 7/18; H01B 9/02
[52] U.S. Cl. .................................. 174/102 R; 55/486;
55/528; 252/66; 308/DIG. 8; 428/36; 428/304;
428/306; 428/308; 428/323; 428/324; 428/325;
428/327; 428/331; 428/364
[58] Field of Search ................ 428/36, 364, 221, 421,
428/422, 317, 324, 363, 331, 325, 443, 327, 328,
310, 315; 174/102 R, 110 FC; 260/2.5 R, 2.5 M;
55/486, 528; 252/66; 308/DIG. 8

[56] References Cited

U.S. PATENT DOCUMENTS

| | | | |
|---|---|---|---|
| 3,054,761 | 9/1962 | Moore et al. | 264/127 |
| 3,198,691 | 8/1965 | Thomas et al. | 428/422 |
| 3,231,460 | 1/1966 | Andrews | 428/443 |
| 3,265,092 | 8/1966 | Ely et al. | 428/36 |
| 3,322,608 | 5/1967 | Mason et al. | 428/422 |
| 3,365,355 | 1/1968 | Netsch | 428/421 |
| 3,407,249 | 10/1968 | Landi | 428/421 |
| 3,486,961 | 12/1969 | Adams | 428/421 |
| 3,513,064 | 5/1970 | Westley | 428/422 |
| 3,783,057 | 1/1974 | McNerney | 428/421 |
| 3,887,761 | 6/1975 | Gore | 174/110 FC |
| 3,953,566 | 4/1976 | Gore | 264/288 |
| 3,962,153 | 6/1976 | Gore | 428/222 |
| 4,031,283 | 6/1977 | Fagan | 428/288 |

FOREIGN PATENT DOCUMENTS

| | | |
|---|---|---|
| 241061 | 3/1950 | Australia. |
| 42-13560 | 8/1967 | Japan. |
| 44-30807 | 12/1969 | Japan. |
| 240497 | 4/1969 | U.S.S.R. |
| 240996 | 6/1969 | U.S.S.R. |

*Primary Examiner*—James . Bell
*Attorney, Agent, or Firm*—John S. Campbell

[57] ABSTRACT

This invention provides a tetrafluoroethylene polymer in a porous form which has an amorphous content exceeding about 5% and which has a micro-structure characterized by nodes interconnected by fibrils. The material has high porosity and high strength. It can be used to produce all kinds of shaped articles such as films, tubes, rods, and continuous filaments. Laminations can be employed and impregnation and bonding can readily be used to produce a large variety of articles. Compressed articles of very high strength can also be produced from these porous forms.

77 Claims, 2 Drawing Figures

*Direction of Uniaxial Expansion*

Fig. 1.

Direction of Uniaxial Expansion

Fig. 2.

POROUS PRODUCTS AND PROCESS THEREFOR

This is a continuation of application Ser. No. 637,298, filed Dec. 3, 1975, now abandoned, which is a division of application Ser. No. 376,188, filed July 3, 1973, now U.S. Pat. No. 3,953,566, which is a continuation of application Ser. No. 39,753, filed May 21, 1970, now abandoned.

Tetrafluoroethylene polymers and, in particular, poly(tetrafluoroethylene) are gaining more and more uses because of their chemical inertness and desirable physical properties such as water-repellancy and electrical insulating abilities. In one very large area, the field of porous articles, their use has been substantially blocked by the very considerable difficulty of making an article porous and keeping it so and providing it with adequate strength. Complicated, expensive processes have been devised such as adding a filler to the polymer prior to shaping and then removing the filler after shaping, for example, by leaching it out of the shaped article with a solvent or by melting or burning it out. Not only are the process steps time consuming but the cost of such processes make them unattractive commercially.

Therefore, an objective of this invention is the provision of economical processes for producing highly porous materials from tetrafluoroethylene polymers. A further aim is to provide such processes which impart very high strengths to the resultant products. A still further purpose is providing the products themselves and, in particular, products from poly(tetrafluoroethylene) which are highly porous and have high strengths. Also, dense products of polytetrafluoroethylene are produced that have extremely high strength. These and other objectives appear hereinafter.

The invention described herein provides products of a tetrafluoroethylene polymer which have outstanding combinations of high porosity and high strength. In this regard they not only exceed previously available fluorocarbon polymeric products, but are unique among porous plastic materials. The porous structure produced by the processes of this invention is permeable and can be laminated, impregnated, and bonded with other materials to provide composite structures having novel and unique properties.

The objectives of this invention are accomplished by a process involving expanding paste-formed products of a tetrafluoroethylene polymer to make them both porous and stronger, and subsequently heat treating them to increase their strength further while retaining a porous structure. Paste-forming techniques are used to convert the polymer in paste form to a shaped article which is then expanded, after removing the lubricant, by stretching it in one or more directions; and while it is held in its stretched condition it is heated to at least 327° C. after which it is cooled. The porosity that is produced by the expansion is retained for there is little or no coalescence or shrinking upon releasing the cooled, final article. The description and the examples below further describe the processes and the products of this invention.

Paste-forming of dispersion polymerized poly(tetrafluoroethylene) is well known commercially. Extrusions of various cross-sectional shapes such as tubes, rods and tapes are commonly obtained from a variety of tetrafluoroethylene resins, and other paste-forming operations such as calendering and molding are practiced commercially. The steps in paste-forming processes including mixing the resin with a lubricant such as odorless mineral spirits and carrying out forming steps in which the resin is subjected to shear, thus making the shaped articles cohesive. The lubricant is removed from the extruded shape usually by drying. In usual practice this unsintered product is heated above the polymer's melting point, generally about 327° C., causing it to sinter or coalesce into an essentially impermeable structure. However, it is the unsintered product that is the precursor of the invention herein.

In this invention it has been found that such paste-formed, dried, unsintered shapes can be expanded by stretching them in one or more directions under certain conditions so that they become substantially much more porous and stronger. This phenomenon of expansion with increase in strength occurs with certain preferred tetrafluoroethylene resins and within preferred ranges of rate of stretching and preferred ranges of temperature. The preferred temperature range is from 35° C. to 327° C. At the lower temperatures within this range it has been found that there is a maximum rate of expansion beyond which fracture occurs, as well as a lower limit beneath which fracture also occurs or where weak materials are obtained. The lower limit is of much more practical significance. At high temperatures within this range, only the lower limit of rate has been detected. The lower limit of expansion rates interact with temperature in a roughly logarithmic fashion, being much higher at higher temperatures. Most, but not all, of the desirable products of this invention are obtained when expansion is carried out at the higher temperatures within the range of 35° C. to 327° C. The balance of orientation in the extruded shape also affects the relationship between the proper range of rates and temperature. It is found that some resins are much more suitable for the expansion process than others, since they can be processed over a wider range of rate and temperature and still produce useful products. The primary requisite of a suitable resin is a very high degree of crystallinity, preferably in the range of 98% or above, and correspondingly low amorphous content. It has been found that techniques for increasing the crystallinity, such as annealing at high temperatures just below the melt point, improve the performance of the resin in the expansion process. Copolymers of tetrafluoroethylene, which have defects in the crystalline structure that introduce a higher amorphous content, do not work as well in this invention as homopolymers. However, it is found, for example, that resins which contain less than 0.2% of hexafluoropropylene as a co-monomer can be made to work in this invention by going to very high rates of expansion at high temperatures just below the melt point.

The porous microstructure of the expanded material is affected by the temperature and the rate at which it is expanded. The structure consists of nodes interconnected by very small fibrils. In the case of uniaxial expansion the nodes are elongated, the longer axis of a node being oriented perpendicular to the direction of expansion. The fibrils which interconnect the nodes are oriented parallel to the direction of expansion. These fibrils appear to be characteristically wide and thin in cross-section, the maximum width being equal to about 0.1 micron (1000 angstroms) which is the diameter of the crystalline particles. The minimum width may be one or two molecular diameters or in the range of 5 or 10 angstroms. The nodes may vary in size from about 400 microns to less than a micron, depending on the conditions used in the expansion. Products which have been expanded at high temperatures and high rates have a more homogeneous structure, i.e. they have smaller, more closely spaced nodes and these nodes are interconnected with a greater number of fibrils. These products are also found to have much greater strength.

It should be noted that during the expansion process a tremendous increase in strength is introduced into the structure, for while the porosity increases the strength actually increases, so there is often greater than a tenfold increase in strength of the polymeric matrix. In patent application Ser. No. 863,446, filed Oct. 3, 1969, a process is described for expanding unsintered poly(tetrafluoroethylene) sheet, rods and shapes to give low density but low strength products. However, I have discovered that by performing the stretching at a very high rate, a surprising increase in strength is obtained. Although most materials fracture when subjected to a high rate of strain, highly crystalline poly(tetrafluoroethylene) withstands this treatment without breaking.

By definition, the tensile strength of a material is the maximum tensile stress, expressed in force per unit cross sectional area of the specimen, which the specimen will withstand without breaking (see, for example, The American Society for Testing and Materials. "1970 Annual Book of ASTM Standards Part 24", at p. 41). For porous materials, the cross sectional area of solid polymer within the polymeric matrix is not the cross sectional area of the porous specimen, but is equivalent to the cross sectional area of the porous specimen multiplied by the fraction of solid polymer within that cross section. This fraction of solid polymer within the cross section is equlvalent to the ratio of the specific gravity of the porous specimen itself divided by the specific gravity of the solid polymeric material which makes up the porous matrix. Thus to compute matrix tensile strength of a porous specimen, one divides the maximum force required to break the sample by the cross sectional area of the porous sample, and then multiplies this quantity by the ratio of the specific gravity of the solid polymer divided by the specific gravity of the porous specimen. Equivalently, the matrix tensile strength is obtained by multiplying the tensile strength computed according to the above definition by the ratio of the specific gravities of the solid polymer to the porous product. In the examples which follow, both tensile strength and matrix tensil strength are shown, computed according to the above method, the lowest matrix strength measured being above 7300 p.s.i. In other words, the products shown herein all have matrix strengths of above about 7300 p.s.i When the expanded products are heated to above the lowest crystalline melting point of the poly(tetrafluoroethylene), disorder begins to occur in the geometric order of the crystallites and the crystallinity decreases, with concomitant increase in the amorphous content of the polymer, typically to 10% or more. These amorphous regions within the crystalline structure appear to greatly inhibit slippage along the crystalline axis of the crystallite and appear to lock fibrils and crystallites so that they resist slippage under stress. Therefore, the heat treatment may be considered an amorphous locking process. The important aspect of amorphous locking is that there be an increase in amorphous content, regardless of the crystallinity of the starting resin. Whatever the explanation, the heat treatment above 327° C. causes a surprising increase in strength, often doubling that of the unheat-treated material.

Because the upper melting range of poly(tetrafluoroethylene) polymer as (polymerized) is about 345° C., the heat treatment appears to be more effective above this temperature, although lower temperatures are equivalent if the exposure time is long enough. The optimum heat treating temperature is in the range of 350° C. to 370° C. and the heating periods required may range from about 5 seconds to about one hour. The microstructure of the expanded product is not substantially changed by the amorphous locking step. However, if the amorphous locking is carried out at too high a temperature for too long a time, the microstructure may become coarse as the nodes increase in size and the fibrils rupture, and in this case there is a noticeable deterioration in strength, but this presents no problem since one can very readily determine the optimum time and temperature for the given tetrafluoroethylene polymer being processed. Temperatures above about 390° C. may cause this disintegration and loss of strength in less than one minute. In heat treating films it is essential that they be held so they cannot retract during the amorphous locking process. It is surprising that the expanded structures of this invention do not coalesce during the heat treatment to form high density products. If unexpanded films, having a density of about 1.5 gm/cm$^3$ are so heated, they coalesce to form an essentially void-free material having a room temperature density of about 2.15 gm/cm$^3$. Very little increase in density occurs when the products below about 1.00 gm/cm$^3$ density are heated above the 327° C. temperature.

The increase in strength of the polymer matrix is dependent upon the strength of the extruded material before expansion, the degree of crystallinity of the polymer, the rate and temperature at which the expansion is performed, and amorphous locking. When all these factors are employed to maximize the strength of the material, tensile strengths of 10,000 psi and above, with porosity of 90% or more are obtained. In these cases the polymeric matrix has strengths in excess of 100,000 psi. In contrast, the maximum tensile strength of conventional extruded or molded poly(tetrafluoroethylene) after sintering is generally considered to be about 3,000 psi, and for conventional extruded and calendered poly(tetrafluoroethylene) tape which has been sintered the maximum is about 5,100 psi.

Before describing examples of processes and products within this invention, a further description of the properties of expanded, amorphous-locked tetrafluoroethylene polymers will be helpful. As indicated above, some of the properties of these expanded, amorphously locked polymers are substantially different from the corresponding properties of conventional extruded or molded tetrafluoroethylene polymers. As a result of these differences, expanded, amorphously locked materials are useful in many applications where extruded or molded materials cannot be used.

These expanded, amorphous-locked materials have permeabilities to gases, and to liquids in some cases, which are much higher than the corresponding permeabilities of conventional molded or extruded poly(tetrafluoroethylene). The permeability to nitrogen of conventional poly(tetrafluoroethylene) film is reported in The Journal of Teflon, Jan.-Feb. 1970 (du Pont) at page 10 to be about $1 \times 10^{-10}$ metric units.

In comparison, expanded, amorphous-locked films of this invention have permeabilities to nitrogen from about $1 \times 10^{-8}$ to $1 \times 10^{-1}$ metric units. These higher permeabilities are consistent with the lower densities and higher porosities of the expanded, amorphous-locked films, compared with conventional films. Furthermore, by controlling the degree of expansion and the amorphous-locking conditions used, it is possible to make tetrafluoroethylene polymeric materials having any desired permeability within the range listed above. These permeability differences are due primarily to differences in pore sizes within the materials.

Also, permeabilities to liquids of the expanded, amorphous-locked materials described herein are higher, in an analogous way, than corresponding permeabilities to liquids of the conventional materials.

As a result of the ability of the expanded, amorphous-locked materials described herein to transmit fluids are described, these materials are useful as filtering membranes to separate solid materials from gases and from liquids. For optimum filtering rates, relatively low-permeability, small-pore size membranes are used to filter out small solid particles, and high-permeability, large-pore size membranes are used to filter out large solid particles.

Also, the expanded, amorphous-locked materials described herein are useful as semi-permeable membranes for separating wetting fluids from non-wetting fluids. For example, a gas-saturated membrane in contact with water and gas will transmit the gas, the wetting phase, as described above. But it will not transmit the water, the non-wetting phase, as long as the pressure in the water phase does not exceed the water entry pressure for that particular combination of membrane and fluids.

One factor which influences entry pressure of a non-wetting fluid into a porous material is the size of the pores. Since the size of the pores in the expanded, amorphous-locked materials described here can be and are controlled by the conditions used in the expanding and amorphous-locking operations, these materials are very useful, under a wide variety of conditions, as semi-permeable membranes.

The usefulness of the materials covered by this invention as filtering membranes for separating solids from fluids or as semi-permeable membranes for separating immiscible fluids from each other is enhanced by the following well-known highly desirable properties of tetrafluoroethylene polymeric materials: (1) outstanding chemical inertness and (2) resistance to undesirable physical changes over a wide temperature range.

The expanded, amorphous-locked material of this invention can be bonded to other materials and to itself much more readily than conventional poly(tetrafluoroethylene) products can. This is true because bonding agents are able to penetrate a significant distance into the pore network of expanded, amorphous-locked material, and, after hardening, they become locked in place. In contrast, there is negligible penetration of bonding agents into conventional tetrafluoroethylene polymers, and this, coupled with the general non-bonding nature of low energy surfaces make bonding difficult.

Certain other properties of expanded, amorphous-locked poly(tetrafluoroethylene) materials are better than the corresponding properties of conventional extruded or molded poly(tetrafluoroethylene) products, making the former materials more useful in many applications than the latter. The thermal conductivity of molded conventional poly(tetrafluoroethylene) is about 1.7 Btu/hr/sq.ft./°F./in. while that of the expanded, amorphous-locked polymer ranges from about one-tenth to about one-half that value. In line with this, the more highly expanded materials of this invention have proven to be useful thermal insulators.

Similarly, expanded, amorphous-locked poly(tetrafluoroethylene) has shown an advantage over the conventional homopolymer as an electrical insulator in coaxial cables. The lower dielectric constant of the former, about 1.2 to 1.8, as compared with 2.2 for conventional polymer, permits smaller and lighter cables to be constructed by using the former. Many applications in which weight-saving (i.e. use of low density material) is an advantage can benefit by using the expanded, amorphous-locked polymers described herein in preference to conventional high density tetrafluoroethylene polymers.

This invention will be further understood by reference to the examples given below and to the drawings, all of which are given for illustrative purposes only and are not limitative, the drawings being.

Figure 1:
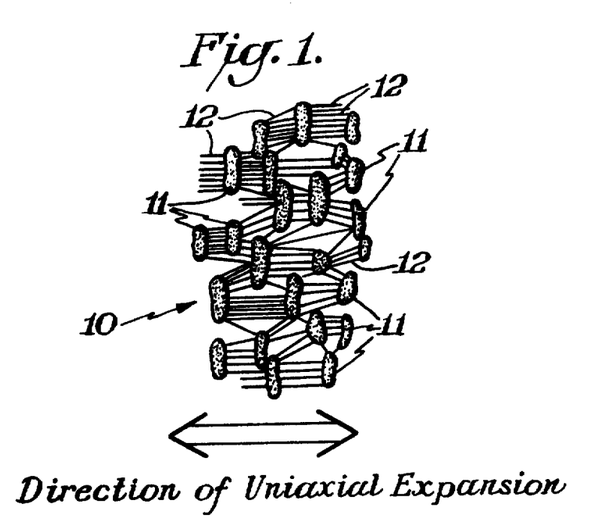
FIG. 1 is a plan view of a section of an expanded, amorphously locked tetrafluoroethylene polymer as seen under a microscope.

As shown in FIG. 1, the expanded, amorphously locked, porous material 10 of this invention comprises a large plurality of nodes 11 which are oriented perpendicularly to the direction in which the expansion was effected. These nodes, on the average about 50 microns in size and fairly irregular in shape, lie closely together and in many instances appear to touch at points. A given node is connected to adjacent or nearby nodes by fibrils 12 which vary in length from 5 to 500 microns depending upon the amount of expansion. While FIG. 1 shows a uniaxial expansion effect, it will be appreciated that with expansion biaxially and with expansion in all directions, similar fibril formation occurs in said directions with the production of spider-web-like or cross-linked configurations and attendant increases in strength. The porosity also increases as the voids or spaces between the polymeric nodes and fibrils become more numerous and larger in size.

Figure 2:
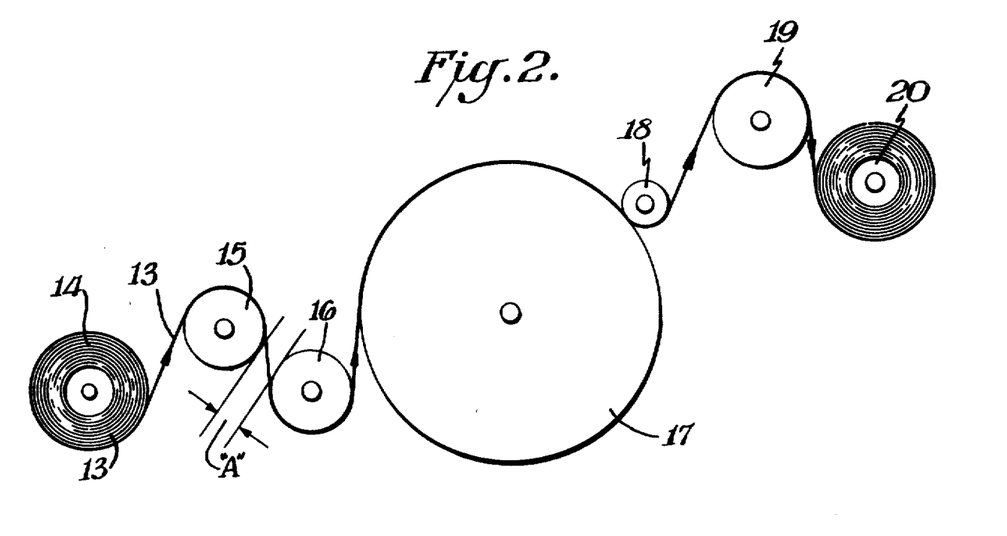
FIG. 2 is a diagrammatical view of an apparatus that may be used in the process of this invention to produce the expanded, amorphously-locked structures.

The apparatus shown in FIG. 2 is described below in Example 5.

EXAMPLE 1

Expansion of Rods

A cylindrical rod of 5/32 inch diameter was made by extruding a paste of "Teflon" 6A resin containing 130 cc/lb. of mineral spirits as an extrusion aid, at a reduction ratio of 370 (the resin being obtainable from E. I. du Pont de Nemours & Co., Inc.). The volatile extrusion aid was removed by drying, the resultant rod having a specific gravity of 1.63, a tensile strength of 531 psi, and an elongation of 183% (A.S.T.M. test method). The amorphous content of the "Teflon" 6A resin and the unsintered rod were determined using the infra-red method described by Moynihan, R. E. "IR Studies on Polytetrafluoroethylene", J. Am. Chem. Soc. 81, 1045–1050 (1959), and found to be 1.5%.

An apparatus was devised so that samples of the rod could be stretched various amounts at controlled rates and controlled temperatures. The apparatus consisted of two clamps for holding the rod, one clamp being held fixed within an oven while the other clamp was attached to a wire leading outside the oven to a rack-and-pinion pulling device driven by a variable speed motor.

After the sample had been expanded by stretching at the given controlled temperature, the oven temperature was raised to 370° C. for ten minutes while the samples were held clamped in their extended condition. In some cases the samples broke during the expansion step and this is noted in tables below. The term "broke" refers to the fact that the particular sample being tested broke under the conditions given as an attempt was being made to stretch it to the final elongation given; the precise percentage of elongation at which the given sample broke is not given.

As can be seen in Table 1A, all samples were successfully expanded to a porosity of about 68% under the conditions of temperature and rate of stretch shown. Table 1B shows that samples at the lower values of temperature and rate could not be expanded by stretching 550%, while the rest of the samples were successfully expanded to a porosity of about 84%. Table 1C shows that only two samples were successfully expanded when the stretch was 1500%. These samples were obtained at the highest values of rate and temperature and had a porosity of about 96%.

TABLES 1A, 1B and 1C

Table 1A: Percent Stretch = 200

| Temperature °F. | Rate of Stretch 30%/sec. | Rate of Stretch 100%/sec. | Rate of Stretch 1000%/sec. | Rate of Stretch 5000%/sec. |
|---|---|---|---|---|
| 200 | 67% porosity | 67% porosity | 67% porosity | 66% porosity |
| 400 | 66% porosity | 68% porosity | 67% porosity | 66% porosity |
| 600 | 66% porosity | 66% porosity | 67% porosity | 68% porosity |

Table 1B: Percent Stretch = 550

| Temperature °F. | Rate of Stretch 30%/sec. | Rate of Stretch 100%/sec. | Rate of Stretch 1000%/sec. | Rate of Stretch 5000%/sec. |
|---|---|---|---|---|
| 200 | broke | broke | broke | broke |
| 400 | broke | 84% porosity | 85% porosity | 85% porosity |
| 600 | broke | 84% porosity | 84% porosity | 83% porosity |

Table 1C: Percent Stretch = 1500

| Temperature °F. | Rate of Stretch 30%/sec. | Rate of Stretch 100%/sec. | Rate of Stretch 1000%/sec. | Rate of Stretch 5000%/sec. |
|---|---|---|---|---|
| 200 | broke | broke | broke | broke |
| 400 | broke | broke | broke | broke |
| 600 | broke | broke | 96% porosity | 96% porosity |

This example illustrates that the most highly expanded products of this invention are obtained when the expansion is carried out at high temperatures and high rates of stretch. The amorphous content of these rods was found to be 24%.

EXAMPLE 2

Expansion of Rods

Rods 5/32 inch in diameter were manufactured under conditions similar to Example 1, except that "Teflon" 6C resin was used, this also being obtainable from said du Pont company. The amorphous content of the "Teflon" 6C resin and the unsintered rod were found to be 3%. While effective expansion was not obtained under the conditions of Example 1, at very much higher rates of expansion, expansion within this invention did occur:

TABLE 2

| Temperature °F. | Percent Stretch = 550 | | |
|---|---|---|---|
| | Rate of Stretch 5,000%/sec. | Rate of Stretch 10,000%/sec. | Rate of Stretch 40,000%/sec. |
| 200 | broke | broke | broke |
| 400 | broke | broke | 68% porosity |
| 600 | broke | broke | 68% porosity |

Amorphously locking the porous products obtained applying the 40,000%/sec. rate of expansion was effected and the microstructures of the products conformed to such as shown in FIG. 1. The amorphous content after heat treatment at 370° C. was 35%.

EXAMPLE 3

Expansion of Films

The following experiments were performed using a pantograph, which is a machine capable of stretching films biaxially or uniaxially over a range of rates and temperatures. The pantograph used in these experiments was capable of stretching 4"×4" samples of film to 16"×16". The 4"×4" film was gripped on each side by 13 actuated clamps, which moved apart uniformly on a scissor mechanism. The film was heated by hot air flow above and below.

A sample of film 6 inches wide, 0.036 inch thick, and of continuous length was produced by the paste extrusion process from "Teflon" 6A poly(tetrafluoroethylene) using 105 cc of mineral spirits per pound of resin as an extrusion aid. After removing the extrusion aid by drying, the unsintered film was found to have the following properties: specific gravity of 1.65, longitudinal tensile strength of 300 psi and transverse tensile strength of 250 psi.

Ex. 3(a): A 4" by 4" sample of this film was conditioned for approximately 4 minutes at 225° C. in the pantograph and then stretched biaxially at a rate of 500%/sec. in each direction to a size of 16"×16". The temperature of the film was then raised to 370° C. for 5 minutes while held clamped in the extended condition. The film was then cooled to ambient temperature and the following properties were found: specific gravity of 0.15, longitudinal tensile strength of 2,500 psi (a matrix tensile strength of 36,700 psi) and transverse tensile strength of 2,230 psi.

Ex. 3(b): A sample was prepared in all ways similar to Example 3(a) except that it was stretched in the pantograph at the lower rate of 55%/sec. The resulting film was still cohesive but was found to have weak areas, and a non-uniform appearance.

Ex. 3(c): A sample was prepared in all ways similar to Example 3(a) except that it was stretched at the even lower rate of 5%/sec. The film did not expand, but ruptured.

Ex. 3(d): A sample was prepared in all ways similar to Example 3(a) except that the temperature during expansion was 50° C. This film did not expand, but ruptured.

Ex. 3(e): A sample of paste-extruded film was taken before removal of the extrusion aid and calendered to a thickness of 0.0043 inch. The physical properties of the film were measured: specific gravity of 1.60; longitudinal tensile strength of 2,200 psi, and transverse tensile strength of 270 psi.

Samples of this film were stretch on the pantograph. The results are summarized in Table 3.

TABLE 3

| Temperature °C. | Example 3(e) Expansion Rate In Longitudinal Direction (%/sec.) | Expansion Rate In Transverse Direction (%/sec.) | Result |
|---|---|---|---|
| 225 | 500 | 500 | Ruptured |
| 225 | 500 | 0 | Long. Tensile = 3900 psi (a matrix tensile strength of 12,800 psi) Trans. Tensile = 1150 psi Spec. Gravity = 0.70 |
| 225 | 0 | 500 | Ruptured |
| 50 | 500 | 500 | Ruptured |
| 50 | 500 | 0 | Ruptured |
| 50 | 0 | 500 | Long. Tensile = 2400 psi (a matrix tensile strength of 7,360 psi) Trans. Tensile = 2700 psi Spec. Gravity + 0.75 |
| 225 | 5 | 5 | Ruptured |
| 225 | 5 | 0 | Ruptured |
| 225 | 0 | 5 | Ruptured |
| 50 | 5 | 5 | Ruptured |
| 50 | 5 | 0 | Ruptured |
| 50 | 0 | 5 | Ruptured |

From the tabulated results, it can be seen that the film responded differently depending on which axis was stretched but that at the low rates rupture occurred irrespective of the direction of expansion.

EXAMPLE 3(f)

Expanded Films Made By Biaxial Stretching

Another 4"×4" sample of film of the type described in the second paragraph of Example 3 above was stretched in the pantograph machine. In this case, the film was stretched simultaneously in two directions at right angles to each other, 100% in each direction. Thus, the surface area of the stretched film was four times the surface area of the original film.

The film temperature was about 300° C. during the stretching operation. Linear stretching rates of about 400% per second in each dimension were used.

With the expanded film still in tension (stretcher clamps still holding the stretched film), hot air was circulated over the film such that the film temperature was about 360° C. for five minutes. This caused amorphous locking within the film.

Finally, with the stretcher clamps still holding the film, the film was cooled rapidly to room temperature by blowing cold air against it. The cooled film, which was then removed from the clamps, was the desired expanded, amorphous-locked film.

Properties of the original unexpanded film and of the final expanded, amorphous-locked film, which show the advantage of this invention, are listed below.

TABLE 4

| Property | Original Unexpanded Film | Expanded Amorphous-Locked Film |
|---|---|---|
| Film Length, relative units | 1 | 1.9 |
| Film Width, relative units | 1 | 2.0 |
| Film Thickness, mils | 36.0 | 31.5 |
| Specific Gravity | 1.65 | 0.45 |
| Long. Tensile Strength, psi | 300 | 1900 (matrix tensile strength of 9,290 psi) |
| Transverse Tensile Strength, psi | 250 | 1760 |
| Permeability to air, metric units | $4 \times 10^5$ | $6 \times 10^3$ |

EXAMPLE 4

Expansion of Filled Films

The "Teflon" 6A resin, identified above, was blended with a commercially available asbestos powder in proportion of four parts by weight resin to one part asbestos. The mixture was lubricated with 115 cc of odorless mineral spirits per pound of mixture and extruded into a film 6" wide, 0.036" thick, and of continuous length. The film was then calendered to 0.008" thickness and the extrusion aid removed by drying. The properties were measured and found to be as follows: specific gravity of 1.44, longitudinal tensile strength of 1,000 psi; and transverse tensile strength of 205 psi.

A 4"×4" sample was mounted in the pantograph described above and stretched at a rate of 500%/sec. at a temperature of 225° C. and to three times its original length in the longitudinal direction while no stretch was applied in the transverse direction. A sample of the film was tested and found to have the following properties: specific gravity of 0.82, longitudinal tensile strength of 1500 psi, and transverse tensile strength of 145 psi. The remainder of the sample was placed in clamps to restrain it from shrinking, heated to 370° C. for five minutes, and then cooled to room temperature. The following properties were measured on this sample: specific gravity of 0.95, longitudinal tensile strength of 2,900 psi, and transverse tensile strength of 750 psi.

The heat treating of the film substantially increased its tensile strength as can be seen from the above values, and had a very little effect on specific gravity.

EXAMPLE 5

Manufacture of Continuous Lengths of Porous Film

A machine was constructed for manufacturing long lengths of expanded film. As can be seen in FIG. 2, unsintered film 13 from the paste extrusion process is fed to the machine from roll 14 onto heated roll 15 where the film is preheated to the temperature at which it will be expanded. Rolls 15 and 16 are of the same diameter and are connected through a gear box so their relative rates of rotation can be changed. Roll 16 can be driven faster than roll 15 so that the film is stretched in the gap "A" between the rolls making the film expand. The difference in speed determines the amount of stretch and thus the amount of expansion. For example, when roll 16 is driven twice as fast as roll 15, the film is expanded approximately 100% because, unlike other films, the unsintered poly(tetrafluoroethylene) film changes very little in thickness or width and the length increases by 100%. The increase in volume is due to an increase of porosity and a corresponding decrease of specific gravity. The relative positions of rolls 15 and 16 are adjustable so that the gap "A" between them can be varied. This allows one to control the rate of expansion. For example, when the gap distance is halved, the rate of expansion is doubled. It should be noted that the rate of expansion is also affected by the rate at which film is fed into the machine. Roll 16 is maintained at the same temperature as roll 15. Expanded film leaves roll 16 and goes onto roll 17 (running at the same peripheral speed) which is hot, and where the film is heated to approximately 370° C. so that amorphous locking will occur. The residence time of film on this roll is controlled by the position of roll 18, which can be moved around the periphery of roll 17. Roll 19 is water cooled to reduce the temperature of the film as it passes thereover before being wound up on roll 20. Thus, with this machine one is able to control the three important variables necessary for expanding tetrafluoroethylene polymer film, i.e. the temperature, the rate of expansion, and the amount of expansion.

Three runs on this apparatus are given in Table 5.

pushed one film lightly against the other over the whole area of contact. This assembly was given an amorphous-locking treatment by heating it at about 370° C. for 7 minutes. Then the whole assembly was rapidly cooled with a stream of cold air, and clamps were released yielding the desired one-piece laminated film.

The tensile strength of the expanded, amorphous-locked laminate was 4300 psi in each direction. Its thickness was 6.4 mils.

EXAMPLE 7

Expanded, Amorphous-Locked Film As A Filtering Membrane Or A Semi-Permeable Membrane An extruded, calendered, unsintered "Teflon" 6A poly(tetrafluoroethylene) film was made using the known conventional procedure described above. This film was expanded and amorphously locked using the machine of FIG. 2 and the process of this invention described herein. Expansion was carried out at a temperature of about 300° C., and amorphous locking at about 370° C. Properties of the original film and the expanded, amorphous-locked film are listed below:

TABLE 9

| Property | Original Unexpanded, Unsintered Film | Expanded Sintered Film |
| --- | --- | --- |
| Thickness, mils | 4.0 | 3.5 |
| Surface area*, relative units | 1.0 | 2.8 |
| Specific Gravity | 1.46 | 0.60 |
| Permeability to air, metric units | $1.0 \times 10^{-4}$ | 0.032 |
| Permeability to kerosene, metric units | $7.0 \times 10^{-7}$ | $2.3 \times 10^{-4}$ |

*Length × width

TABLE 5

| Resin: | "Fluon" CD-1 (obtainable from Imperial Chemical Industries, Ltd.) | "Teflon" 6A | "Teflon" 6A preheated 3 hrs. at 300° C. prior to paste extrusion |
| --- | --- | --- | --- |
| Properties of starting film: | | | |
| Thickness of Film | 0.0050" | 0.0050" | 0.0050" |
| Density, gm/cm$^3$ | 1.47 | 1.52 | 1.54 |
| Longitudinal tensile, psi | 1600 | 1900 | 2650 |
| Transverse tensile, psi | 200 | 250 | 350 |
| Processing conditions: | | | |
| Tape feed rates: | | | |
| roll 14 to roll 15 | 30 ft./min. | 30 ft./min. | 30 ft./min. |
| Temp., Rolls 15 and 16 | 300° C. | 300° C. | 300° C. |
| Roll speed ratio: | | | |
| roll 15:roll 16 | 1:2.87 | 1:2.87 | 1:2.87 |
| Temp. for roll 17 | 370° C. | 370° C. | 370° C. |
| Dwell time on roll 17 | 3 sec. | 3 sec. | 3 sec. |
| Properties of Final Film: | | | |
| Thickness | 0.0047" | 0.0048" | 0.0046" |
| Density, gm/cm$^3$ | 0.66 | 0.67 | 0.73 |
| Long, Tensile, psi | 2850 (matrix tensile strength of 9,500 psi) | 4000 (matrix tensile strength of 13,100 psi) | 8950 (matrix tensile strength of 27,000 psi) |
| Transverse tensile, psi | 850 | 1050 | 1300 |

EXAMPLE 6

Expanded, Amorphously Locked, Laminated Film Made From Two Layers of Expanded Film Using the tape expanding machine illustrated in FIG. 2 but with the amorphous-locking roll 17 set at 300° C., a sample of expanded, "Teflon" 6A poly(tetrafluoroethylene) film was made. This film had a specific gravity of 0.60 longitudinal tensile strength of 1900 psi (a matrix tensile strength of 7,300 psi), transverse tensile strength of 110 psi, and a thickness of 3.5 mils.

Two sections of this film at right angles to each other and one on top of the other, were clamped to a rigid frame which secured all four edges of the sandwich and Smoke-containing air was filtered through a sample of the expanded, amorphous-locked film described above. It was observed that the filtered air was clean, and the filtering rate was relatively high. A similar effort to filter smoke-containing air using a sample of the unexpanded, unsintered film described above was unsuccessful because the filtering rate was too low.

Similarly, samples of the expanded, amorphous-locked film described above were used to filter solids from suspensions of the solids in various organic liquids.

Again, good separations were obtained, and filtering rates were reasonably high. However, similar attempts using samples of the unexpanded, unsintered film described above again were unsuccessful because of extremely low filtering rates.

When an effort was made to flow water through the (air-saturated) expanded, amorphous-locked film described above using 5 psi flowing pressure, no flow occurred. However, when the applied flowing pressure exceeded 10 psi, the water entry pressure of the gas-saturated membrane, flow started, and thereafter flow of water through the membrane was quite similar to the flow of wetting organic liquids. This membrane was found to be useful in separating solids from dispersions of the solids in water.

A sample of the expanded, amorphous-locked film described above was fitted into the cone of a filtering funnel, and a mixture of kerosene and water was poured into the funnel. The kerosene flowed through the film at a reasonably rapid rate, but no water penetrated the film since the pressure in the water phase was lower than the water entry pressure into either the gas-saturated or the kerosene-saturated film. Thus, the expanded, amorphously locked film was found to be an effective semi-permeable membrane useful in separating fluids that wet tetrafluoroethylene polymers from non-wetting fluids. Similar attempts to use the unexpanded, unsintered film described above as a semi-permeable membrane were unsuccessful because of the extremely low flow rates involved.

EXAMPLE 8

Expanded, Amorphously Locked Film Impregnated With Poly(Methyl Methacrylate)

A part of the expanded, amorphous-locked film prepared as described in Example 7 was painted with a freshly made solution of 1% of polymerization initiator 2,2'azo-bis (2-methylpropionitrile) in methyl methacrylate). The solution was rapidly imbibed into the expanded, amorphously locked film. Any excess solution not so imbibed was wiped from the surface of the film.

Then the impregnated film was warmed, causing the methyl methacrylate to polymerize within the pores of the expanded, amorphous-locked film, thus yielding a film having pores filled with poly(methyl methacrylate).

The comparison shown below of the properties of conventional extruded, calendered, unsintered poly(tetrafluoroethylene) film with those of the expanded, amorphous-locked, film impregnated with the methacrylate polymer shows clearly the greater dimensional stability of the impregnated film without significant increase in the coefficient of friction. These properties make impregnated materials of the type described here particularly useful as bearing materials. The substantially lower cost of the impregnated material, as compared with the conventional homopolymer or copolymers, is a further benefit of this invention.

TABLE 10A

| Property | Conventional Unexpanded, Unsintered Film | Expanded, Amorphous-Locked, Impregnated Film |
| --- | --- | --- |
| Deformation, 150 psi Compressive Stress at 77° F., % | 2.7 | 0.7 |
| Coefficient of Friction | | |

TABLE 10A-continued

| Property | Conventional Unexpanded, Unsintered Film | Expanded, Amorphous-Locked, Impregnated Film |
| --- | --- | --- |
| against Glass | 0.20 | 0.21 |

In further impregnation experiments, a piece of expanded, amorphous-locked poly(tetrafluoroethylene) film made as described in Example 10 was impregnated with a low viscosity epoxy resin, ERLA 2256, a product of and obtainable from Union Carbide Corporation. A second piece of the film was impregnated with a solution of metaphenylenediamine in methyl ethyl ketone. When the ketone had evaporated, the two pieces, with the longitudinal dimension of one coinciding with the transverse dimension of the other, were placed in contact with each other, and the assembly was heated at about 300° F. for about three hours.

The two pieces were firmly bonded by the hardened epoxy resin. Properties of the laminate were as follows:

TABLE 10B

| Property | Expanded, Amorphous-Locked Film | Laminate |
| --- | --- | --- |
| Longitudinal tensile strength, psi | 8,100 | 8,800 |
| Transverse tensile strength, psi | 1,500 | 8,800 |
| Deformation, 100 psi Compressive Stress at 77° F., % | 13 | 1.2 |
| Coefficient of Friction Against Glass | 0.14 | 0.14 |

EXAMPLE 9

Use Of Expanded, Amorphous-Locked Tape As Core Of A Coaxial Cable

Expanded, amorphous-locked tape was made following the procedure described in Example 7. Two such tapes were made, both having a specific gravity of about 0.66, one having a thickness of 2.5 mils, the other, 10 mils. Alternate wraps of (1) the thinner tape, (2) the thicker tape, and (3) the thinner tape were used to make up a core separating the inner conductor of the coaxial cable from an outer metallic braided shield. An outer jacket constructed of conventional poly(tetrafluoroethylene) covered the shield. The characteristic impedance of the cable was 100 ohms.

A second coaxial cable having an impedance of 100 ohms was constructed, in this case using conventional, unexpanded tape to construct the core. After sintering, the density of the poly(tetrafluoroethylene) core was about 2.15 gms/cc.

Because of the lower dielectric constant of expanded, amorphous-locked poly(tetrafluoroethylene) over that of the conventional polymer, a smaller, lighter cable was obtained when expanded, amorphous-locked tape was used. This is shown in detail in the following table.

TABLE 11

| Item | A<br>100 Ohm<br>Impedance<br>Cable<br>Made Using<br>A Core Of<br>Conventional<br>Polymer | B<br>100 Ohm<br>Impedance<br>Cable<br>Made Using A<br>Core Of Expanded,<br>Amorphously Locked<br>Polymer |
|---|---|---|
| Conductor Weight, g/ft | 0.064 | 0.064 |
| Polymer Insulation, g/ft | 3.890 | 0.464 |
| Braided Metal Shield, g/ft | 2.700 | 1.898 |
| Polymer Jacket, g/ft | 0.855 | 0.569 |
| Core Diameter, in. | 0.110 | 0.065 |
| Outer Diameter of Cable, Inch. | 0.140 | 0.095 |
| Total Cable Weight, g/ft | 7.509 | 2.995 |

The data listed above show that the use of expanded, amorphous-locked polymer in B rather than conventional polymer in A as the core in this cable led to a 60% reduction in weight and a 32% reduction in size of the cable.

EXAMPLE 10

Films Which Are Very Greatly Expanded And Then Amorphous-Locked

Unsintered, extruded, calendered poly(tetrafluoroethylene) film was made using the known conventional procedure described in earlier examples. This film had a thickness of 4.0 mils.

Using the apparatus of FIG. 2 and above procedures, parts of this film were expanded without amorphous-locking using a step-wise procedure. The machine was set at 190% expansion for each of the expansion runs. Then samples of the expanded films were passed through the machine to lock them amorphously at 370° C. without further expansion. The steps followed in this work are explained in the following diagram:

Properties of the films produced as described above are listed below:

TABLE 12

| Film Identity | Expansion, % | Thickness, mils | Specific gravity |
|---|---|---|---|
| Original film | none | 4.0 | 1.50 |
| Product 1 | 190 | 3.8 | 0.50 |
| Product 2 | 190 × 2 | 3.8 | 0.27 |
| Product 3 | 190 × 3 | 3.1 | 0.18 |
| Product 4 | 190 × 4 | 2.8 | 0.17 |

| Film Identity | Porosity % | Bulk Long. Tensile Strength, psi | Long. tensile strength of polymeric matrix, psi |
|---|---|---|---|
| Original film | 35 | 1,640 | 2,600 |
| Product 1 | 78 | 2,900 | 14,000 |
| Product 2 | 88 | 2,420 | 30,000 |
| Product 3 | 92 | 2,400 | 30,000 |
| Product 4 | 93 | 2,400 | 34,000 |

EXAMPLE 11

"Teflon" 6A polymer was heated for 3 hours at 300° C., cooled, blended with 80 cc of refined kerosene per pound of polymer, and extruded into a film 6 inches wide, 0.030 inch thick, using a reduction ratio of about 100 (reduction ratio=cross-section area of extrusion cylinder divided by the cross-section of the extrudate). The extruded film was then passed through successive sets of rolls, each heated to about 80° C., and reduced in thickness from 0.030" to 0.002". This film was dried to remove the kerosene and passed through the apparatus of FIG. 2 at a rate of 100 ft./min. over roll 15, with rolls 15 and 16 heated to 320° C. and adjusted with their outer peripheries as close together as possible without crushing the 0.002" film between them. Roll 16 (and 17, 18, 19) was rotated at a peripheral speed seven times greater than roll 15, thus stretching the film about sevenfold. The film was passed over roll 17 at 370° C. and wound up on take-up 20. Rolls 15, 16, 17, 18 and 19 were then adjusted to the same peripheral speed of 30 ft./min., rolls 15, 16 and 17 adjusted to 370° C., and the stretched film passed through the apparatus under these conditions in order to accomplish an adequate heat treating. The properties of the film were as follows:

| Thickness | .0019" |
|---|---|
| Density gm/cm$^3$ | .23 |
| Longitudinal tensile psi | 12,200 |
| Longitudinal tensile of polymer material | $\frac{2.2 \text{ gm/cc}}{.23 \text{ gm/cc}} \times 12,200 = 117,000$ psi |

EXAMPLE 12

Amorphous Content of Polymer

A sample of film was prepared as in Example 11 except that it was rolled to a thickness of 0.004". This film was then expanded using the same process as in Example 5 except that roll 17 was not heated. Heat treatments were carried out on samples of this film at 335° C., 350° C., and 390° C. for various lengths of time. The amorphous content of the polymer was determined at each stage in the process using the infra-red method described by Moynihan, R. E. "IR Studies on Polytetrafluoroethylene", J. Am. Chem. Soc. 81, 1045–1050 (1959). The properties of the films were as follows:

TABLE 13

| | Longitudinal Tensile Strength | Matrix Tensile Strength | |
|---|---|---|---|
| | | % Amorphous | Density gm/cm$^3$ |
| "Teflon" 6A powder, heat treated | | 1.5% | |
| Extruded, dried .004" film | 2650 | 1.5% | 1.5 |

TABLE 13-continued

| | Longitudinal Tensile Strength | Matrix Tensile Strength | |
|---|---|---|---|
| | | % Amorphous | Density gm/cm$^3$ |
| Expanded not heat-treated | 4200/14,200 | 1.5% | .68 |
| Heated to 335° C.: | | | |
| 1 second | 5580/18,500 | 2.5% | .69 |
| 10 seconds | 5630/18,400 | 3% | .70 |
| 50 seconds | 6020/19,700 | 4% | .70 |
| 480 seconds | 7540/24,600 | 5% | .70 |
| Heated to 350° C.: | | | |
| 1 second | 7630/24,700 | 10% | .70 |
| 3 seconds | 7670/24,900 | 10% | .70 |
| 10 seconds | 7820/25,200 | .15% | .70 |
| 20 seconds | 7830/24,900 | 25% | .70 |
| 50 seconds | 8360/26,400 | 30% | .70 |
| 100 seconds | 8610/27,100 | 33% | .70 |
| 480 seconds | 8900/27,900 | 35% | .70 |
| Heated to 390° C.: | | | |
| 1 second | 7500/23,500 | 25% | .71 |
| 3 seconds | 7960/23,900 | 35% | .73 |
| 10 seconds | 7830/23,400 | 38% | .73 |
| 20 seconds | 7270/20,300 | 40% | .78 |
| 50 seconds | 6560/16,800 | 40% | .85 |
| 90 seconds | disintegrated | | |

EXAMPLE 13

High Strength, Low Porosity Films

A sample of expanded but not heat-treated film from Example 12 was placed in a platen press, compressed at 300 psi and white held compressed, the platens were heated to 350° C. and then cooled rapidly. The longitudinal tensile strength of the resulting film was 24,000 psi and the density 2.10 gms/cm$^3$, about 3% porosity. Therefore, it is possible to produce very high strength, high density products by compressing the expanded material during the amorphous-locking step. The fibril-node structure is preserved even though the porosity is reduced to about 3%. With higher pressures it is possible to further reduce the porosity and still preserve the very high strength of the material.

A second sample of the expanded film from Example 12 which had been heat treated at 350° C. for 8 minutes was placed in the press at room temperature and compressed at 1500 psi for several minutes. The film was clear and transparent. Its density was 2.05 gms/cm$^3$ and longitudinal tensile strength was 21,000 psi. Therefore, it is feasible to compress the porous structure of the product and still preserve the high strength of the bulk polymer.

The foregoing examples clearly show the desirable effect of expansion and amorphous-locking on the tensile strength and density characteristics of the products, and also that the high tensile strength is retained when the porous structure is compressed.

The formation of the porous material by this invention can be accomplished using poly(tetrafluoroethylene) or copolymers of tetrafluoroethylene with other monomers. Such monomers are ethylene, chlorotrifluoroethylene, or fluorinated propylenes, such as hexafluoropropylene. These monomers are used only in very small amounts since it is preferred to use the homopolymer for the reason that it presents the optimum crystalline/amorphous structure for the process and the products of this invention. Thus, amounts of the comonomers are generally less than 0.2% and it is highly preferred to use poly(tetrafluoroethylene). While the above examples show the use of asbestos as a filler, it is to be appreciated that a wide variety of fillers can be incorporated such as carbon black, pigments of various kinds as well as inorganic materials such as mica, silica, titanium dioxide, glass, potassium titanate, and the like. Further, fluids may be used which include dielectric fluids or materials such as the polysiloxane materials shown in U.S. Pat. No. 3,278,673.

While the invention has been disclosed herein in connection with certain embodiments and certain structural and procedural details, it is clear that changes, modifications or equivalents can be used by those skilled in the art; accordingly, such changes within the principles of the invention are intended to be included within the scope of the claims below.

What is claimed is:

1. A porous material consisting essentially of highly crystalline polytetrafluoroethylene polymer, which material has a microstructure characterized by nodes interconnected by fibrils and has a matrix tensile strength in at least one direction above about 7,300 psi.

2. A porous material in accordance with claim 1 containing a small amount of a copolymer.

3. A porous material in accordance with claim 2 in which said copolymer is a copolymer of tetrafluoroethylene and ethylene.

4. A porous material in accordance with claim 2 in which said copolymer is a copolymer of tetrafluoroethylene and chlorotrifluoroethylene.

5. A porous material in accordance with claim 2 in which said copolymer is a copolymer of tetrafluoroethylene and hexafluoropropylene.

6. A porous material in accordance with claim 1 in which a majority of said fibrils are made up of individual fibrils having diameters of about 5 angstroms to about 1000 angstroms.

7. A porous material in accordance with claim 1 in which a majority of said nodes have lengths from about 0.5 micron to about 400 microns.

8. A porous material in accordance with claim 1 which has not been heated to a temperature above 327° C. and has a crystallinity greater than about 95%.

9. A porous material consisting essentially of polytetrafluoroethylene polymer, which material has a microstructure characterized by nodes interconnected by fibrils and has a matrix tensile strength in at least one direction above 9290 psi, which material has been heated to a temperature above the crystalline melt point of said polymer and has a crystallinity below about 95%.

10. A material in accordance with claim 1 which has been compressed to reduce its porosity and has a porosity below about 40%.

11. A porous material in accordance with claim 1 which is in the form of a shaped article.

12. A porous material in accordance with claim 9 which is in the form of a shaped article.

13. A product in accordance with claim 11 which is in the form of a film.

14. A product in accordance with claim 12 which is in the form of a film.

15. A product in accordance with claim 11 which is in the form of a tube.

16. A product in accordance with claim 12 which is in the form of a tube.

17. A product in accordance with claim 11 which is in the form of continuous filaments.

18. A product in accordance with claim 12 which is in the form of continuous filaments.

19. A product in accordance with claim 11 which is rod-like in form.

20. A product in accordance with claim 12 which is rod-like in form.

21. A porous material in accordance with claim 1 which has a porosity of less than about 97%.

22. A porous material in accordance with claim 9 which has a porosity of less than about 97%.

23. A porous material in accordance with claim 21 which has a porosity of 40-75%.

24. A porous material in accordance with claim 22 which has a porosity of 40-75%.

25. A porous material in accordance with claim 1 which has a matrix tensile strength in at least one direction in excess of 100,000 psi.

26. A porous material in accordance with claim 1 which has a matrix tensile strength in at least one direction of about 12,800 psi.

27. A porous material in accordance with claim 9 which has a matrix tensile strength in at least one direction of about 13,100 psi.

28. A porous material in accordance with claim 9 which has a matrix tensile strength in at least one direction of about 16,800 psi.

29. A porous material in accordance with claim 9 which has a matrix tensile strength in at least one direction of about 20,300 psi.

30. A porous material in accordance with claim 9 which has a matrix tensile strength in at least one direction of about 25,200 psi.

31. A porous material in accordance with claim 9 which has a matrix tensile strength in at least one direction of about 30,000 psi.

32. A porous material in accordance with claim 9 which has a matrix tensile strength in at least one direction of about 36,200 psi.

33. An electrical conductor insulated with the porous material of claim 1.

34. An electrical conductor insulated with the porous material of claim 9.

35. A laminated structure comprising (a) a first shaped article formed of a porous material made of a tetrafluoroethylene polymer, which material has a microstructure characterized by nodes interconnected by fibrils and has a matrix tensile strength in at least one direction above about 7,300 psi, and (b) a second shaped article bonded to said first shaped article.

36. The structure of claim 35 in which said first shaped article is formed of a porous material which has a matrix tensile strength in at least one direction of at least 9290 psi, and has a crystallinity below about 95%.

37. The laminated structure of claim 36 in which a bonding agent bonds said first shaped article to said second shaped article, and said bonding agent is present in the pore network of portions of said porous material that are positioned adjacent said second shaped article.

38. The laminated structure of claim 36 in which said second shaped article is formed of a porous tetrafluoroethylene polymer which has a matrix tensile strength in at least one direction of at least 9290 psi, and a crystallinity below about 95%.

39. The laminated structure of claim 38 in which said second shaped article is bonded to said first shaped article by amorphous locking of two abutting poly(tetrafluoroethylene) surfaces.

40. An improvement in coaxial cable of the type comprising an inner conductor, an insulating core, and an outer metallic shield, the improvement comprising: a core formed of porous poly(tetrafluoroethylene) tape wrapped around the conductor, the poly(tetrafluoroethylene) having a microstructure characterized by nodes interconnected by fibrils, a matrix tensile strength in at least one direction above about 9290 psi, and a crystallinity below about 95%.

41. The coaxial cable of claim 40 in which said porous poly(tetrafluoroethylene) tape has a dielectric constant of from 1.2–1.8.

42. A porous material made of a tetrafluoroethylene polymer, which material has a microstructure characterized by nodes interconnected by fibrils, which material (a) has a matrix tensile strength in at least one direction above about 9290 psi, (b) has been heated to a temperature above 327° C. and has a crystallinity below about 95%, and (c) has a thermal conductivity between about 0.17 Btu/hr/sq.ft./°F./in. and 0.85 Btu/hr/sq.ft./°F./in.

43. A porous material made of a tetrafluoroethylene polymer, which material has a microstructure characterized by nodes interconnected by fibrils, which material (a) has a matrix tensile strength in at least one direction above about 9290 psi, (b) has been heated to a temperature above 327° C. and has a crystallinity below about 95%, and (c) has a dielectric constant of 1.2–1.8.

44. A porous material made of a tetrafluoroethylene polymer, which material has a microstructure characterized by nodes interconnected by fibrils, which material (a) has a matrix tensile strength in at least one direction above about 9290 psi, (b) has been heated to a temperature above 327° C. and has a crystallinity below about 95%, and (c) has a permeability to nitrogen of from about $1 \times 10^{-8}$ to $1 \times 10^{-1}$ metric units.

45. A filled structure comprising
   (a) a shaped article formed of a porous material made of a tetrafluoroethylene polymer which material has a microstructure characterized by nodes interconnected by fibrils and a matrix tensile strength in at least one direction above about 7,300 psi, and
   (b) a filler within the pores of said shaped article.

46. The structure of claim 45 in which said shaped article is formed of a porous material made of a tetrafluoroethylene polymer, which article has a matrix tensile strength in at least one direction of at least 9290 psi, and has a crystallinity below about 95%.

47. The structure of claim 45 in which the filler is asbestos.

48. The structure of claim 45 in which the filler is carbon black.

49. The structure of claim 45 in which the filler is a pigment.

50. The structure of claim 45 in which the filler is mica.

51. The structure of claim 45 in which the filler is silica.

52. The structure of claim 45 in which the filler is titanium dioxide.

53. The structure of claim 45 in which the filler is glass.

54. The structure of claim 45 in which the filler is potassium titanate.

55. The structure of claim 45 in which the filler is a dielectric fluid.

56. The structure of claim 45 in which the filler is a polysiloxane.

57. The structure of claim 46 in which the filler is carbon black.

58. The structure of claim 46 in which the filler is a pigment.

59. The structure of claim 46 in which the filler is mica.

60. The structure of claim 46 in which the filler is silica.

61. The structure of claim 46 in which the filler is titanium dioxide.

62. The structure of claim 46 in which the filler is glass.

63. The structure of claim 46 in which the filler is potassium titanate.

64. The structure of claim 46 in which the filler is a dielectric fluid.

65. The structure of claim 46 in which the filler is a polysiloxane.

66. The structure of claim 46 in which the filler is asbestos.

67. An impregnated structure comprising
(a) a shaped article formed of a porous material made of a tetrafluoroethylene polymer which material has a microstructure characterized by nodes interconnected by fibrils and a matrix tensile strength in at least one direction above about 9290 psi, and
(b) a polymer impregnated within the pores of the said shaped article.

68. The impregnated structure of claim 67 in which the polymer impregnated within the pores of the said shaped article is poly(methyl methacrylate).

69. A bearing material made of the impregnated structure of claim 67.

70. A bearing material made of the impregnated structure of claim 68.

71. The product of claim 1 in which said material has been expanded by stretching at a rate exceeding about 10% per second, and by maintaining said material at a temperature between about 35° C. and the crystalline melt point of said polytetrafluoroethylene polymer during said stretching, such that its final length in the direction of expansion is greater than about twice its original length.

72. The product of claim 71 in which said final length is greater than about three times said original length.

73. The product of claim 71 in which said final length is greater than about five times said original length.

74. The product of claim 71 in which said final length is greater than about seven times said original length.

75. The product of claim 71 in which said final length is about fifteen times said original length.

76. The product of claim 71 in which said final length is greater than about twenty-four times said original length.

77. The structure of claim 35 in which the first shaped article is a sheet having pores that will pass a gas but will not pass liquid water.

* * * * *